United States Patent [19]
Sanders

[11] Patent Number: 6,085,848
[45] Date of Patent: *Jul. 11, 2000

[54] APPARATUS FOR LAYING A SURFACE

[75] Inventor: Trevor George Sanders, Workingham, United Kingdom

[73] Assignee: Thames Water Utilities Limited, Reading, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/766,298

[22] Filed: Dec. 13, 1996

[30] Foreign Application Priority Data

Dec. 15, 1995 [GB] United Kingdom .................... 9525688

[51] Int. Cl.⁷ ............................ A01B 27/00; A01B 31/00
[52] U.S. Cl. ......................................... 172/684.5; 172/197
[58] Field of Search ................................. 172/196, 197, 172/684, 681.5, 146, 150, 151, 170, 199, 200, 612; 404/128, 124, 127

[56] References Cited

U.S. PATENT DOCUMENTS

| | | | |
|---|---|---|---|
| 3,448,814 | 6/1969 | Bentley et al. | 172/197 X |
| 4,436,040 | 3/1984 | Chumtey | 172/634.5 X |
| 4,836,295 | 6/1989 | Estes | 172/197 X |
| 5,213,164 | 5/1993 | Monk | 172/684.5 X |

FOREIGN PATENT DOCUMENTS

| | | |
|---|---|---|
| 302 205 | 12/1928 | United Kingdom . |
| 738 388 | 9/1953 | United Kingdom . |
| 2 016 553 | 3/1979 | United Kingdom . |
| 1 603 952 | 12/1981 | United Kingdom . |
| 2 147 183 | 5/1985 | United Kingdom . |
| 2 223 655 | 4/1990 | United Kingdom . |

Primary Examiner—Robert E. Pezzuto
Attorney, Agent, or Firm—Alix, Yale & Ristas, LLP

[57] ABSTRACT

The invention relates to a dresser for dressing particulate material, such as sand, in a slow sand filter of a water treatment works. The dresser includes a frame having transverse mixing members which are adapted to mix the material at or adjacent the surface of the particulate material.

19 Claims, 4 Drawing Sheets

APPARATUS FOR LAYING A SURFACE

The invention relates to a dresser, particularly to a dresser for dressing particulate material such as sand in a slow sand filter in water treatment works.

It is often necessary to loosen or break up a surface layer of sand prior to its being compacted or levelled, or both.

It is accordingly an object of the invention to seek to provide a dresser for such a purpose.

According to the invention there is provided a dresser for particulate material, comprising a frame having means adapted to mix the material at or adjacent the surface thereof.

The frame may comprise a plurality of spaced apart transverse mixing means. This provides for mixing of a substantial area of say sand.

The mixing means may comprise substantially parallel rods. This provides a relatively simple construction, particularly where the rods may be metal rods.

The frame may have means for mounting on a towing device. This provides for case of use.

The mounting means may be adapted to incline the frame at an angle to the horizontal. This provides for progressive mixing in use.

The angle may be substantially 45°, which is a suitable angle.

The rods may comprise different diameters. This provides for a thorough mixing action.

In an alternative, the mixing means may comprise one or more tines.

There may be a dresser as hereinbefore defined, in combination with a compaction device, preferably being pivotably mounted on the compaction device.

Dressers embodying the invention are hereinafter described, by way of example, with reference to the accompanying drawings.

Figure 1:
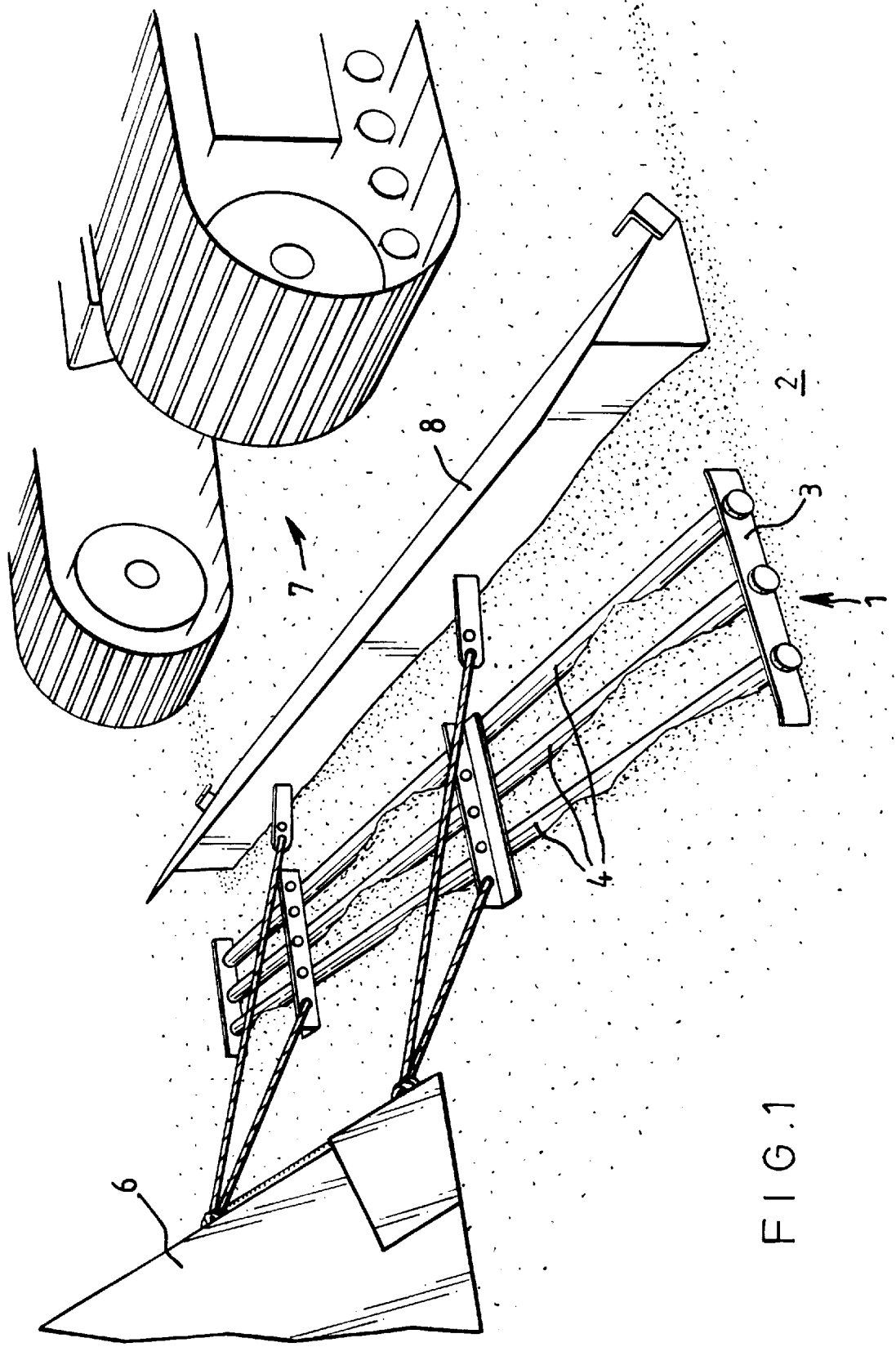
FIG. 1 is a perspective view of one embodiment of dresser according to the invention.
Figure 2:
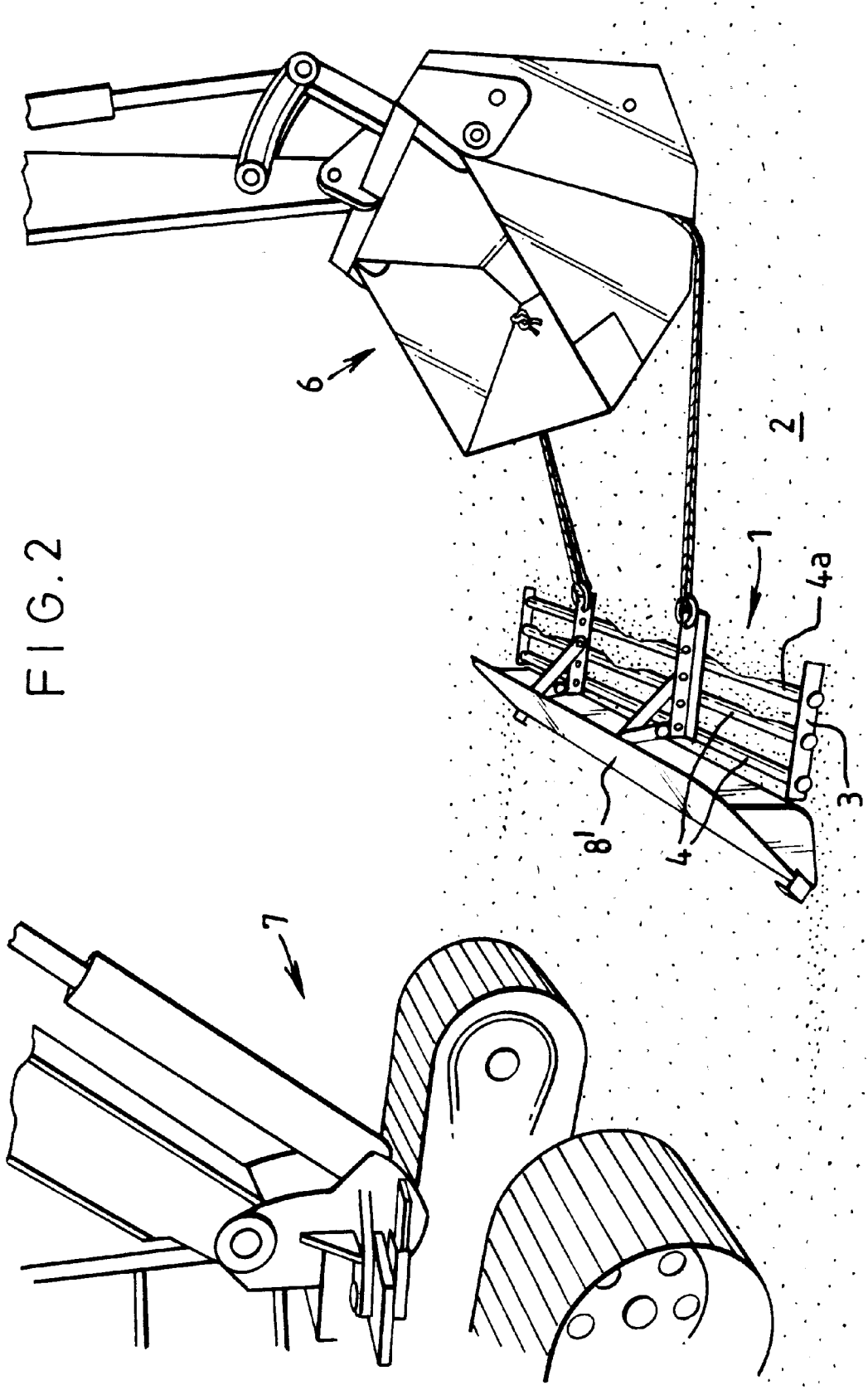
FIG. 2 is a perspective view of a second embodiment of dresser according to the invention.
Figure 3:
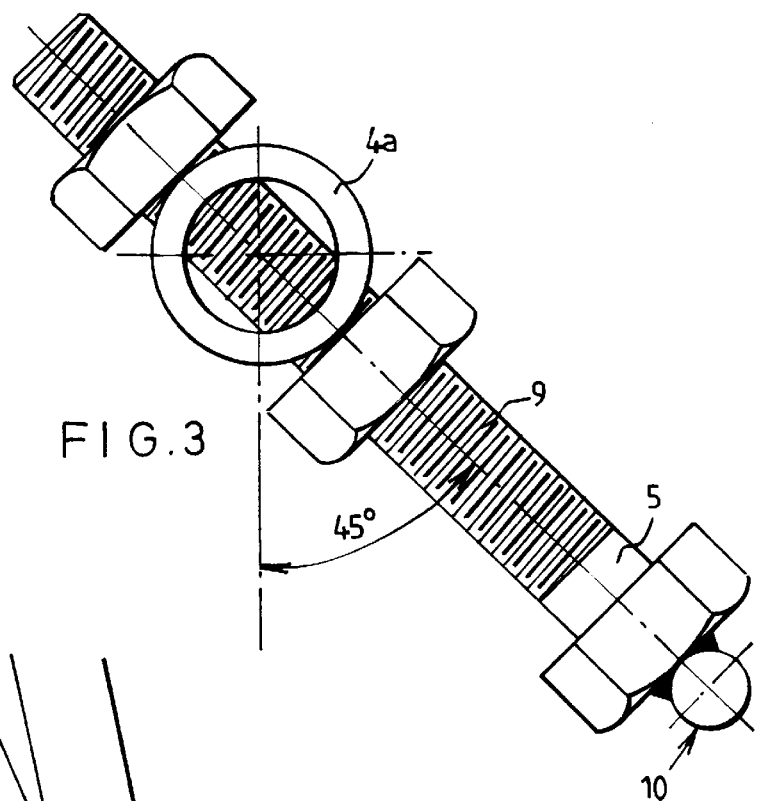
FIG. 3 is to an enlarged scale a side elevational view of the dresser according to FIGS. 1 or 2.

Referring to the drawings, there is shown in FIGS. 1, 2 and 3 a dresser 1 for particulate material, such as sand in a slow sand filter 2 of a water treatment works, comprising a frame 3 having means such as transverse mixing means 4 which are adapted to mix the material at or adjacent the surface thereof.

The frame 3 has in FIGS. 1 and 2 three spaced apart transverse metal rods or bars 4 forming the mixing means, a forward bar 4a in use being just below the surface. The forward bar 4a is spaced from a forward end 5 of the frame, and in use is towed at or just below the surface of the sand This breaks up, loosens and chums the sand, which is further mixed by the downstream bars 4, where the frame 3 is substantially horizontal as in FIG. 1 being dragged forward by a bucket 6 of a tractor 7 to which it is secured as by ropes, and behind which dresser there is a trailing compaction device 8.

In FIG. 2, the frame 3 is pivotably mounted on a trailing compaction device 8' by pivotable mounts so as to be inclined to the surface, to enhance the mixing action.

The frame has side rods 9 between which the bars 4a, 4 extend, there being a bar 10 welded to nut heads or ends of the rods. The rods 9 are at 45° to the horizontal.

Figure 4:
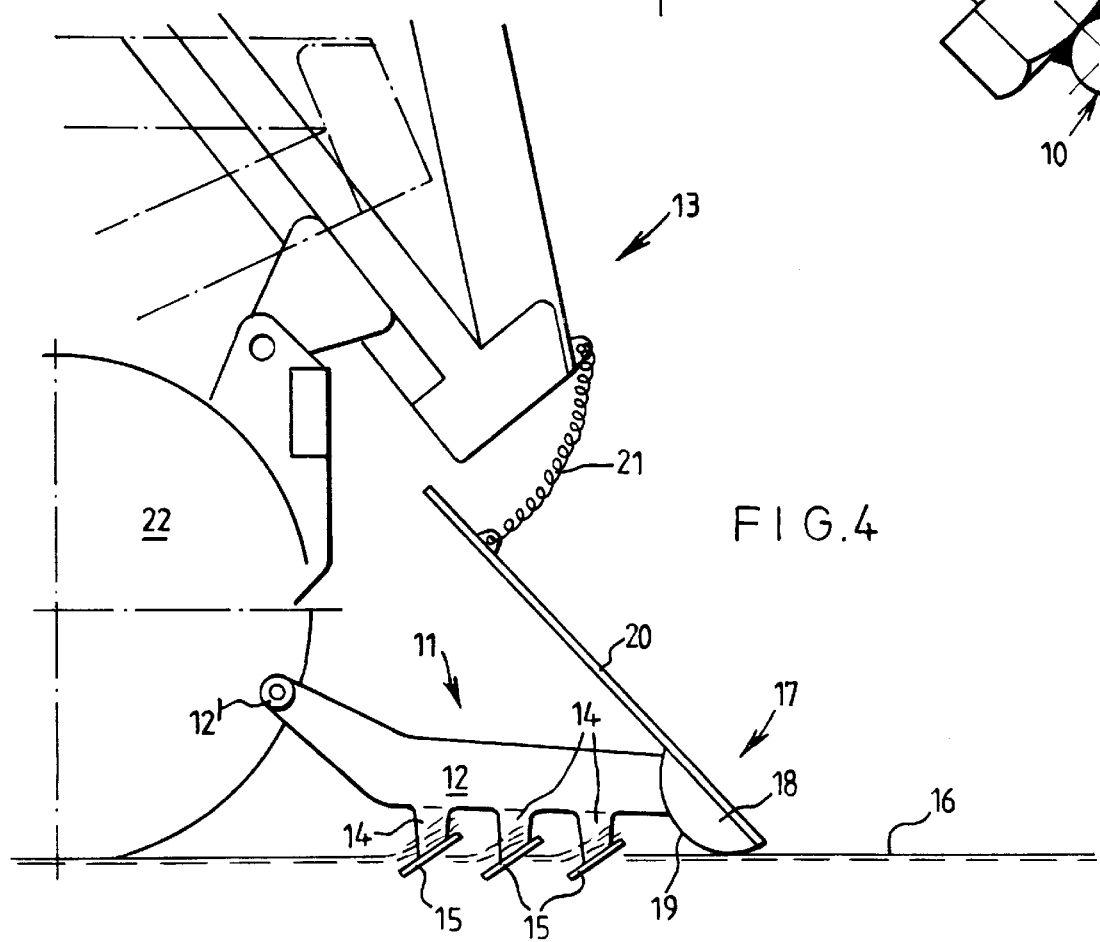
FIG. 4 is a schematic side elevational view of a third embodiment of a dresser according to the invention.

Referring now to FIG. 4. the embodiment of dresser 11 shown comprises a body 12 pivotably mounted at 12' in use to a vehicle 13 such as a tractor or dumper behind which it is towed from right to left as viewed.

The body 12 comprises a plurality of downwardly (as viewed) projecting arms 14 which each support inclined bars 15 which in use mix up a particulate such as sand surface 16 of a slow sand filter. There is a compaction device 17 in the form of a skid or shoe 18 which is secured to the body 12, having a forwardly convex surface 19 for compacting the surface after mixing. There is an extension arm 20 which projects upwardly, and is connected to the body of the vehicle by a flexible connector such as a chain 21.

The body 12 extends substantially over the width of the vehicle, as in FIGS. 1 and 2. In use, as the vehicle 13 travels from right to left, ruts are produced in the sand surface 16 by the vehicle wheels 22. These are stressed by the bars 15 of the dresser 11 entering the top surface and mixing up the sand as the dresser 11 passes from right to left, the compactor 17 then bearing on the mixed surface to smooth it and compact it. The embodiment 11 is also applicable for removal of an activated carbon layer if a lower sand layer is dressed using the embodiment. This is because the sand is smooth and presents a "clean" line of demarcation between it and the carbon, which can then be readily removed with an element for lifting it which is set to the required depth.

Figure 5:
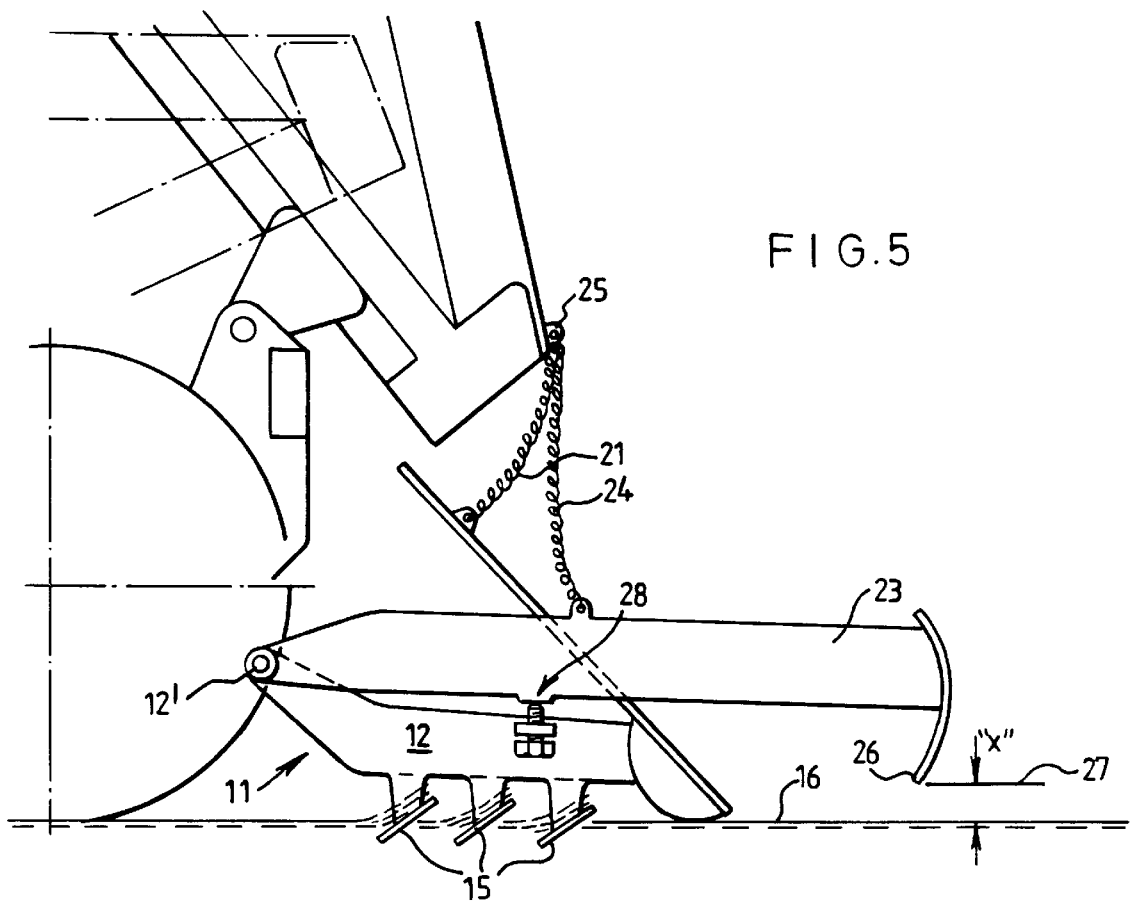
FIG. 5 is a side elevational view of a fourth embodiment of a dresser according to the invention.

Referring now to FIG. 5, there is shown a dresser 11 like that of FIG. 4, with the addition of a further element such as a plough or bar grader 23, also secured to the vehicle by a flexible connector 24 such as a chain, mounted at the same mounting point 25 as the chain 21. The plough or bar grade 23 is pivotably mounted to the vehicle, in the embodiment at the common pivot point 12' with the dresser 11. The distance of a working edge 26 of the plough or bar grader 23 above a dressed surface 16 over which material 27 is being laid is set by height adjuster means or stop 28 in the form of a rotatable stud. Stated in another way, the thickness 'X' of material 27 such as granular activated carbon laid on the dresser surface 16 is determined by the setting or adjustment of this adjustable stop 28.

In every embodiment, particularly FIGS. 4 and 5, the angle of the bars 15 is adjustable for adjusting the mixing action. The dresser 11 can be adjusted in dressing position by the chain 23 which can be raised by a raisable part of the vehicle to which it is mounted at 25.

It will also be understood that in all the embodiments, the dresser is stowable off the ground by raising the vehicle part to raise the dresser etc. by chain 21 or chains 21 and 24 so that the dresser is clear of the material 16 or 27.

I claim:

1. A dresser for dressing particulate material when the dresser is moved across the surface of the particulate material in an upstream direction, the dresser comprising:

(i) a frame;

(ii) the frame having a plurality of spaced mixing means which are adapted to mix the material at or substantially adjacent to the surface thereof, the mixing means being oriented at least substantially normal to the upstream direction of movement and not at least generally normal to the surface of the particulate material;

(iii) a bar grader including a working edge downstream of the frame and pivotably mounted in relation thereto; and (iv) height adjuster means adapted to adjust the distance of the working edge of the grader relative to the surface of the particulate material.

2. A dresser as defined in claim 1, further comprising a compaction device.

3. A dresser as defined in claim 1, wherein the mixing means comprise substantially parallel spaced elements.

4. A dresser as defined in claim 1, wherein the mixing means are made of metal.

5. A dresser as defined in claim 1, wherein the frame further comprises mounting means for mounting the dresser on a towing device.

6. A dresser as defined in claim 5, wherein the mounting means are adapted to incline the frame at a non-zero angle relative to the surface of the particulate material.

7. A dresser as defined in claim 3, wherein the mixing means elements are at least substantially circular in cross-section, and wherein at least two of the elements have different diameters relative to one another.

8. A dresser as defined in claim 1, wherein the mixing means further comprise at least one tine.

9. A dresser as defined in claim 1, further comprising at least one compactor element and wherein the frame is located upstream of the compactor element.

10. A dresser as defined in claim 1, further comprising a plough and wherein the frame is located upstream of the plough.

11. A dresser as defined in claim 2, wherein the dresser is pivotably mounted on the compaction device such that the dresser can be inclined relative to the surface of the particulate material.

12. A dresser for dressing particulate material when the dresser is moved across the surface of the particulate material in an upstream direction, the dresser comprising:

a frame having a plurality of elongated and spaced mixing means which are adapted to mix the particulate material at or substantially adjacent the surface of the particulate material, the elongated mixing means being oriented at least substantially parallel to the surface of the particulate material;

a bar grader including a working edge downstream of the frame and pivotably mounted in relation thereto; and height adjuster means adapted to adjust the distance of the working edge of the grader relative to the surface of the particulate material.

13. A dresser as defined in claim 12, further comprising at least one compactor element and wherein the frame is located upstream of the compactor element.

14. A dresser as defined in claim 13, wherein the dresser is pivotably mounted on the compaction device such that the dresser can be inclined relative to the surface of the particulate material.

15. A dresser as defined in claim 12, wherein the mixing means comprise substantially parallel spaced elements.

16. A dresser as defined in claim 12, wherein the mounting means are adapted to incline the frame at a non-zero angle relative to the surface of the particulate material.

17. A dresser as defined in claim 15, wherein the mixing means elements are at least substantially circular in cross-section, and wherein at least two of the elements have different diameters relative to one another.

18. A dresser as defined in claim 12 further comprising:

a common pivot point located on the frame;

a first member extending from the common pivot point and having the mixing means mounted thereto;

a second member extending from the common pivot point generally parallel to at least a substantial portion of the first member and the second member having the bar grader mounted thereto such that the working edge is distal to the common pivot point;

wherein the height adjuster means interconnects the first and second members such that the second member is supportable by the first member.

19. A dresser as defined in claim 12, further comprising a plough and wherein the frame is located upstream of the plough.

* * * * *